United States Patent [19]

Rich et al.

[11] Patent Number: 4,735,981

[45] Date of Patent: Apr. 5, 1988

[54] COMBINATIONS OF ASSOCIATIVE THICKENERS AND AQUEOUS LATEX PAINTS CONTAINING THE SAME

[75] Inventors: Arthur F. Rich, Arlington Heights; Philip C. Benes, Schaumburg; Linus E. Adams, Wheeling, all of Ill.

[73] Assignee: DeSoto, Inc., Des Plaines, Ill.

[21] Appl. No.: 914,988

[22] Filed: Oct. 3, 1986

[51] Int. Cl.$^4$ .................. C08K 3/20; C08K 5/17; C08L 75/04

[52] U.S. Cl. .................. 524/247; 524/501; 524/507

[58] Field of Search .................. 524/247, 501, 507

[56] References Cited

U.S. PATENT DOCUMENTS

| | | | |
|---|---|---|---|
| 4,079,028 | 3/1978 | Emmons et al. | 524/507 |
| 4,122,055 | 10/1978 | Tugukuni et al. | 524/507 |
| 4,442,248 | 4/1984 | Kanda et al. | 524/507 |
| 4,507,426 | 3/1985 | Blake | 524/507 |
| 4,514,552 | 4/1985 | Shay et al. | 524/555 |
| 4,600,761 | 7/1986 | Ruffner et al. | 524/555 |

*Primary Examiner*—Herbert J. Lilling

*Attorney, Agent, or Firm*—Dressler, Goldsmith, Shore, Sutker & Milnamow, Ltd.

[57] ABSTRACT

Alkaline aqueous latex paints are disclosed which have a pH of at least about 7.5 and contain an effective amount of a combination of thickeners constituted by: (I) a urethane polymer having at least three hydrophobic groups, at least two of which are terminal hydrophobic groups, the hydrophobic groups being linked by hydrophilic groups: and (II) an alkali-soluble aqueous emulsion copolymer of: (A) about 20–70 weight percent of an alpha, beta-monoethylenically unsaturated carboxylic acid, typically methacrylic acid; (B) about 20–80 weight percent of a monoethylenically unsaturated monomer lacking surfactant capacity, typically ethyl acrylate; (C) about 0.5–60 weight percent of a nonionic urethane monomer which is the urethane reaction product of a monohydric nonionic surfactant with a monoethylenically unsaturated monoisocyanate; and (D) from 0 up to about 2 weight percent of a polyethylenically unsaturated monomer. Semi gloss paints based on copolymers of at least 55% vinyl acetate are preferred, and the paints are desirably buffered with alkaline agent and/or a polycarboxylic acid electrolyte.

24 Claims, No Drawings

1

COMBINATIONS OF ASSOCIATIVE THICKENERS AND AQUEOUS LATEX PAINTS CONTAINING THE SAME

DESCRIPTION

1. Field of the Invention

This invention relates to associative thickeners which are particularly adapted to be incorporated into aqueous latex paints in order to provide such paints with appropriate rheology for use.

2. Background Art

Aqueous latex paints are made from pigmented aqueous emulsion copolymers and those have found widespread acceptance as houspaints for painting the interior and exterior of homes. However, these paints require thickening and rheology adjustment for proper application by brush or roller, and many thickeners have been used in an effort to provide the rheology which is needed. These have included cellulosic thickeners and synthetic thickeners. However, the prior art thickeners have failed to provide the rheology which is desired in aqueous latex paints, so efforts have been made to combine thickeners in order to achieve a desired balance of rheological characteristics. These prior efforts to provide desired thickening characteristics and the recent efforts to combine thickeners is discussed in Blake U.S. Pat. No. 4,507,426.

In the Blake patent, the combination of thickeners which is employed comprises a carboxyl-functional aqueous emulsion copolymer of monomers including an ester monomer which is a polyether providing nonionic surfactant characteristics in combination with a urethane polymer having at least three hydrophobic groups, at least two of which are terminal hydrophobic groups, the hydrophobic groups being linked by hydrophilic groups. The carboxyl-functional aqueous emulsion copolymer including an ester monomer which is a polyether providing nonionic surfactant characteristics is more particularly an addition copolymer of a copolymerizable carboxylic acid, such as acrylic or methacrylic acid, with a copolymerizable nonionic vinyl monomer, such as an acrylic or methacrylic ester, and a vinyl ester with a nonionic polyether providing nonionic surfactant characteristics. This three-component carboxyl copolymer is used in salt form with a volatile base, like ammonia, to disperse the copolymer colloidally in the alkaline latex paint medium.

In forming the disclosed thickeners, these polymers are combined with the urethane polymer being generally in excess. Thus, about 60 to 97% of the urethane polymer is used together with about 3 to 40% of the carboxyl copolymer. The most preferred weight ratio is indicated to be about 1.6 to 1, the urethane polymer being in excess. These proportions are by weight based on the mixture of polymers.

In preferred practice, the carboxyl copolymer having surfactant characteristics is typically prepared by copolymerizing in aqueous emulsion 35-55% of the carboxylic acid monomer, 35-50% of the nonionic vinyl monomer and about 2-12 percent of the nonionic vinyl surfactant ester. Particularly effective copolymers of this character are indicated to be obtained by copolymerizing about 40-50% of methacrylic acid, about 35-50% of ethyl acrylate, and about 2-12% of the methacrylic ester of a $C_9$-alkyl-phenoxy(ethylenoxy)$_9$ ethyl alcohol. All of these proportions are by weight based on total monomers present in the copolymer.

The urethane polymer having at least three hydrophobic groups, at least two of which are terminal hydrophobic groups, the hydrophobic groups being linked by hydrophilic groups, is subject to considerable variation as more fully described in the Blake patent and in the Emmons and Stevens patent noted therein. More particularly, in the urethane polymer, the hydrophobic groups contain at least about 20 carbon atoms and they are linked together by water-soluble polyether segments each having a molecular weight of at least about 1,500. In preferred practice, an organic diisocyanate is reacted with a polyethylene glycol surfactant molecule having a single hydroxy group at one end and a long chain alkyl group at the other end, this molecule having a molecular weight of at least about 1,500. This provides a urethane polymer having an intermediate water-soluble polyether structure which is capped at each end thereof with terminal alkyl groups which preferably contain from 12-22 carbon atoms.

These urethane polymers are themselves known for thickening aqueous latex paints, this being the subject of U.S. Pat. No. 4,079,028 to Emmons and Stevens which is discussed in the Blake patent. The assignee of the Emmons and Stevens patent, Rohm and Haas Company (Philadelphia, PA) provides these polyurethane thickeners in commerce under the trade designations QR 708, which contains 35% solids, and EXP 300 which contains 30% solids. The EXP 300 produced is used herein as illustrative.

Unfortunately, the blends of thickeners described by Blake fail to provide the desired rheology, and the closest approximation of what is desired is provided when a major weight proportion of the more expensive thickener is present. The inadequacy of the prior art in comparison with what can be provided by this invention will be set forth hereinafter.

It is also known to employ alkali-soluble aqueous emulsion copolymers which include copolymerized nonionic urethane monomer, as taught in G. D. Shay, E. Eldridge and J. E. Kail U.S. Pat. No. 4,514,552, but while these copolymers are more effective thickening agents for aqueous latex paints than those which include vinyl ester surfactant monomers, as used by Blake, these copolymers still do not satisfy the demanding rheological requirements which the paint chemist would like to insist upon. More particularly, the alkali-soluble thickeners disclosed in U.S. Pat. No. 4,514,552 are aqueous emulsion copolymers of (A) about 20-70 weight percent of an alpha, beta-monoethylenically unsaturated carboxylic acid, typically methacrylic acid; (B) about 20-80 weight percent of a monoethylenically unsaturated monomer lacking surfactant capacity, typically ethyl acrylate; (C) about 0.5-60 weight percent of a nonionic urethane monomer which is the urethane reaction product of a monohydric nonionic surfactant with a monoethylenically unsaturated monoisocyanate, preferably one lacking ester groups like alpha, alpha-dimethyl-m-isopropenyl benzyl isocyanate; and (D) from 0 up to about 2 weight percent of a polyethylenically unsaturated monomer. These emulsion copolymers are solublized in water with the aid of an alkali, like ammonium hydroxide, and when they are added to latex paints and neutralized, the viscosity of the paint is increased, brush drag is increased, and the paint rheology is otherwise improved.

DESCRIPTION OF INVENTION

In accordance with this invention, there is incorporated into an alkaline aqueous latex paint having a pH of at least about 7.5 an amount effective to control the rheology of the paint of a combination of thickeners constituted by: (I) a urethane polymer having at least three hydrophobic groups, at least two of which are terminal hydrophobic groups, the hydrophobic groups being linked by hydrophilic groups; and (II) an alkali-soluble aqueous emulsion copolymer of: (A) about 20–70 weight percent of an alpha, beta-monoethylenically unsaturated carboxylic acid, typically methacrylic acid; (B) about 20–80 weight percent of a monoethylenically unsaturated monomer lacking surfactant capacity, typically ethyl acrylate; (C) about 0.5–60 weight percent of a nonionic urethane monomer which is the urethane reaction product of a monohydric nonionic surfactant with a monoethylenically unsaturated monoisocyanate, preferably one lacking ester groups like alpha, alpha-dimethyl-m-isopropenyl benzyl isocyanate; and (D) from 0 up to about 2 weight percent of a polyethylenically unsaturated monomer.

As will be evident, the urethane polymer (I) is the same as that used in the Blake patent, as described hereinbefore. This urethane polymer is desirably used in a weight ratio with respect to the carboxyl-functional emulsion copolymer of from about 60:40 to 10:90, preferably from 50:50 to 20:80. Since the urethane polymer is more costly, it is remarkable to find that the systems which exhibit the better viscosity stability, the ones which possess the best combination of acceptable brush drag and leveling viscosity, and the ones which provide such desirable characteristics with the smallest proportion of buffering agent, are also the ones which are the least costly because they include the smallest proportion of urethane polymer.

Accordingly, one feature of this invention is that, unlike the combination described in the Blake patent which normally requires at least 60% of urethane polymer, this invention preferably employs a minor proportion of urethane polymer based on the combined weight of the two associative thickeners used herein.

The alkali-soluble aqueous emulsion copolymers which are used herein are more fully disclosed in U.S. Pat. No. 4,514,552 which has been discussed previously and which is incorporated by reference. The preferred copolymers which provide alkali-soluble thickeners are aqueous emulsion copolymers of: (A) about 25–60 weight percent of an alpha, beta-monoethylenically unsaturated carboxylic acid, as previously described; (B) about 20–55 weight percent of a monoethylenically unsaturated monomer lacking surfactant capacity, as previously described; (C) about 20–40 weight percent of a nonionic urethane monomer which is the urethane reaction product of a monohydric nonionic surfactant with a monoethylenically unsaturated monoisocyanate, as previously described; and (D) from 0 up to about 2 weight percent of a polyethylenically unsaturated monomer.

The Blake combination of thickeners possesses various inadequacies, as will be demonstrated by comparative testing reported hereinafter. However, one important inadequacy is an intrinsic incompatibility between the urethane thickening component and the copolymer component with its nonionic groups being held to the copolymer by ester moieties. In this invention, the copolymer component has its nonionic groups held to the copolymer by urethane moieties, and improved compatibility is obtained as a result of having both of the thickeners which are combined including nonionic groups attached to urethane groups.

It is important in this invention to employ an alkaline latex paint which is buffered by the inclusion of an alkaline buffering agent to maintain the pH of the paint at a level which will prevent the viscosity from drifting more than 8 Krebs units in the tests reported hereinafter, preferably in the range of about pH 7.5 to pH 11, and more preferably in the range of pH 7.5 to pH 9.5. The pH of the paint is less significant than the capacity of the paint to maintain its pH upon the addition of acidic substances, which is the normal function of a buffering agent. This buffering function can be provided by using a pH above 7.5, so that the higher pH prevents the formation of acidic substances from lowering the pH below 7.5, or by employing conventional buffering agents, as described below.

A particularly preferred alkaline buffering agent is 2-amino-2-methyl-1-propanol, but this is replaceable by other buffering agents which are, per se, known to the art. Appropriate buffering agents are sometimes described as polyelectrolyte dispersants, these being illustrated by Rohm and Haas Company (Philadelphia, PA) product QR-1124 PMN.

The polyelectrolyte dispersants are copolymers containing a major weight proportion of copolymerized monoethylenically unsaturated carboxylic acid, like acrylic acid or methacrylic acid, and a minor weight proportion of another monoethylenically unsaturated monomer, like ethyl acrylate, to provide a resinous polycarboxylic acid which is colloidally dispersible in water with an amine, usually ammonia. The amine is used in an amount to provide a pH in the range of 6.5 to 8.5.

The proportion of buffer is limited because excessive alkaline material induces incompatibility, and also because it is not economical to simply add more alkaline material than is needed to maintain viscosity stability.

It is preferred to use at least about 8 pounds of 2-amino-2-methyl-1-propanol per 100 gallons of paint, but this assumes the absence of a polyelectrolyte dispersant. In the presence of a polyelectrolyte dispersant, it is preferred to use at least 2 pounds of 2-amino-2-methyl-1-propanol in combination with at least 2 pounds of the polelectrolyte dispersant per 100 gallons of paint, preferably at least 3 pounds of 2-amino-2-methyl-1-propanol in combination with at least 4 pounds of the polyelectrolyte dispersant, on the same basis.

It is desired to point out that aqueous alkaline latex paints are usually buffered to provide a stable pH to prevent the conventionally used metal container in which the paint is sold from corroding. The pH must, therefore, be at 7.0 or higher, and normal practice in this invention is to add alkaline buffer material to maintain a pH of at least about 7.5, preferably from pH 8.0–9.5.

The aqueous emulsion paints which are of concern are conventional materials, the binder of the paints being normally based on a copolymer of monoethylenically unsaturated monomers which are balanced to provide a glass transition temperature below about 20° C., usually from −10° C. to +10° C. The preferred copolymers are copolymers of at least 55% vinyl acetate with enough acrylic acid or methacrylic acid esters (as with a $C_1$ to $C_8$ alkanol, like butanol) to provide the desired glass transition temperature. A typical copolymer will contain about 85% vinyl acetate, balance consisting essentially of n-butyl acrylate. While acrylic copolymers are also well known, such as a copolymer of ethyl acrylate and methyl methacrylate in a weight ratio of 2:1, and while the invention is applicable to such copolymers, best results are obtained with paints formulated with the vinyl acetate copolymers described above. All of these aqueous emulsion copolymers are commonly formed to include small amounts, generally less than a total of 3% by weight, of copolymerized monoethylenically unsaturated monomers which promote adhesion, as is conventional in this industry.

Aqueous latex paints may also be classified by the gloss which they produce on drying, and while this invention is applicable to these paints regardless of the gloss to which they dry, the invention is of especial importance to semi-gloss paints because of the leveling characteristics required in these products. In a flat finish, brush marks are more difficult to observe and leveling is less important. On this basis it is preferred that the latex paint when dry exhibit a 60° gloss reading of in excess of 10.

In the tests reported below, viscosity is reported in Krebs units (Ku). The viscosity is measured in a Stormer Viscometer using a fixed shear rate at 77° F. using a variable weight to power a stirrer paddle at a predetermined rotational velocity in the paint. The weight needed for this purpose, in grams, is converted to Krebs units in standard manner.

Our experience suggests that a variation of 10 Ku, more preferably 8 Ku, in the various tests to be described represents the largest change which one can be confident will not introduce unacceptable results in a commercial latex paint.

The paint which was tested was a typical semi-gloss aqueous latex paint having a pH of about 8.0 and containing 34% total solids. The binder was an aqueous emulsion copolymer containing 85% vinyl acetate and 15% n-butyl acrylate, and the paint was pigmented with titaniun dioxide, rutile, to a pigment volume concentration of 17.2%. Semi-gloss paints are particularly benefitted by the rheology control provided by this invention.

This above paint was modified using three different thickeners, namely: a urethane polymer thickener from Rohm and Haas Company EXP 300; a copolymer typical of that prepared in accordance with U.S. Pat. No. 4,514,552 containing 35% methacrylic acid, 30% of ethyl acrylate and 35% of the nonionic surfactant urethane monomer, namely: alpha, alpha-dimethyl-m-isopropenyl benzyl isocyanate; and a carboxyl-functional ester surfactant copolymer from Rohm and Haas Company TT 935 (believed to contain about 47% methacrylic acid, about 48% ethyl acrylate and about 5% of ester surfactant monomer). These thickeners were tested alone and in various combinations with one another, as will be reported.

The tests carried out are as follows:
Test 1—14 days at 77° F.
Test 2—28 days at 77° F.
Test 3—14 days at 130° F.
Test 4—28 days at 130° F.
Test 5—10 days roller stability (cans partially filled with paint are rotated at about 60 rotations per minute while supported on rollers).

TABLE 1

| VISCOSITY CHANGE ON TESTING (in Krebs Units) | | | | | |
|---|---|---|---|---|---|
| 100/0 | 88/12 | 74/26 | 56/44 | 32/68 | 0/100* |
| A-Blends of Urethane Polymer to Urethane Emulsion Copolymer (weight ratio of solids) | | | | | |
| 3 lbs. AMP-95 Buffer/100 gal. of paint | | | | | |
| Test No. 1   4 | 13 | 15 | 15 | 16 | 5 |
| Test No. 2   5 | 11 | 14 | 19 | 13 | 5 |
| Test No. 3   6 | 17 | 15 | 21 | 14 | 3 |
| Test No. 4  10 | 11 | 15 | 19 | 15 | 6 |
| Test No. 5   7 | 15 | 15 | 19 | 14 | 5 |
| 6 lbs. | | | | | |
| Test No. 1   1 | 4 | 8 | 6 | 7 | 1 |
| Test No. 2   2 | 7 | 9 | 8 | 8 | 0 |
| Test No. 3   6 | 14 | 11 | 16 | 12 | 4 |
| Test No. 4   6 | 12 | 13 | 16 | 12 | 3 |
| Test No. 5   3 | 12 | 11 | 11 | 11 | 3 |
| 10 lbs. | | | | | |
| Test No. 1   4 | 7 | 6 | 7 | 5 | 1 |
| Test No. 2   5 | 11 | 12 | 8 | 8 | 0 |
| Test No. 3   8 | 12 | 13 | 10 | 9 | 2 |
| Test No. 4   9 | 12 | 12 | 12 | 8 | 0 |
| Test No. 5   8 | 12 | 10 | 9 | 8 | 3 |
| 15 lbs. | | | | | |
| Test No. 1   5 | 7 | 7 | 5 | 5 | 1 |
| Test No. 2   7 | 9 | 9 | 8 | 6 | 0 |
| Test No. 3   6 | 14 | 12 | 10 | 9 | 7 |
| Test No. 4  13 | 13 | 13 | 8 | 7 | −5 |
| Test No. 5   1 | 8 | 6 | 6 | 8 | 2 |
| *Proportions are ±2%. | | | | | |
| 100/0 | 88/12 | 74/26 | 56/44 | 32/68 | 0/100* |
| B-Blends of Urethane Polymer to Ester Emulsion Copolymer (weight ratio of solids) | | | | | |
| 3 lbs. AMP-95 Buffer/100 gal. of paint | | | | | |
| Test No. 1   4 | 12 | 16 | 15 | 12 | 9 |
| Test No. 2   5 | 18 | 19 | 17 | 15 | 8 |
| Test No. 3   6 | 19 | 19 | 16 | 14 | 11 |
| Test No. 4  10 | 19 | 22 | 18 | 17 | Gelled |
| Test No. 5   7 | 16 | 15 | 16 | 15 | 10 |
| 6 lbs. | | | | | |
| Test No. 1   1 | 8 | 8 | 9 | 9 | 1 |
| Test No. 2   2 | 11 | 13 | 13 | 12 | 0 |
| Test No. 3   6 | 18 | 17 | 16 | 16 | 4 |
| Test No. 4   6 | 18 | 16 | 19 | 16 | 4 |
| Test No. 5   3 | 11 | 12 | 13 | 12 | 2 |
| 10 Lbs. | | | | | |
| Test No. 1   4 | 10 | 11 | 12 | 12 | 5 |
| Test No. 2   5 | 12 | 15 | 16 | 15 | 5 |
| Test No. 3   8 | 13 | 14 | 16 | 14 | 10 |
| Test No. 4   9 | 13 | 21 | 18 | 12 | 11 |
| Test No. 5   7 | 13 | 14 | 16 | 13 | 6 |
| 15 lbs. | | | | | |
| Test No. 1   4 | 9 | 11 | 13 | 12 | 5 |
| Test No. 2   6 | 12 | 13 | 16 | 13 | 7 |
| Test No. 3   5 | 15 | 18 | 20 | 18 | 12 |
| Test No. 4  12 | 16 | 20 | 21 | 19 | 15 |
| Test No. 5   2 | 8 | 9 | 14 | 12 | 4 |
| *Proportions are ±3%. | | | | | |

The above data leads to the conclusion that the urethane polymer, when used alone as the thickener, is only marginally acceptable. The surfactant copolymer used alone as the thickener is usually inadequate. Referring first to part A of the Table which uses the urethane surfactant copolymers, the blends of the two thickeners using only 3 pounds of buffer per 100 gallons of paint are poorly compatible as evidenced by the generally poorer viscosity stability of the blends in comparison with the viscosity stability of either of the components which are blended. As will be seen shortly, the urethane polymer used alone does not provide good rheological properties when incorporated into latex paints, and it is the blends which provide the best properties, but these are poorly stable. Also, it will be seen from part A of the above Table that the stability of the blends improves with the proportion of buffer, but the surfactant copolymers which are esters remain poorly stable, as shown in part B of the above Table. It will shortly be seen that the rheological properties are also poor for the blends with surfactant copolymers which are esters, and that this is especially true when the proportion of urethane polymer is minimized to conserve expense.

TABLE 2

COMPARISON OF RHEOLOGY

| | 100/0 | 88/12 | 74/26 | 56/44 | 32/68 | 0/100* |
|---|---|---|---|---|---|---|
| A-Blends of Urethane Polymer to Urethane Emulsion Copolymer (weight ratio) | | | | | | |
| 3 lbs. AMP-95 Buffer/100 gal. of paint | | | | | | |
| Leveling (poise) | 158 | 95 | 506 | 1185 | 1864 | 3729 |
| Brush Drag (poise) | 2.97 | 2.81 | 2.26 | 2.33 | 2.11 | 1.79 |
| 6 lbs. | | | | | | |
| Leveling (poise) | 379 | 664 | 853 | 1090 | 1785 | 2228 |
| Brush Drag (poise) | 3.19 | 2.65 | 2.55 | 2.36 | 2.04 | 2.04 |
| 10 lbs. | | | | | | |
| Leveling (poise) | 190 | 474 | 458 | 474 | 1169 | 1043 |
| Brush Drag (poise) | 3.16 | 2.68 | 2.36 | 2.24 | 1.69 | 1.72 |
| 15 lbs. | | | | | | |
| Leveling (poise) | 458 | 284 | 300 | 458 | 1074 | 1406 |
| Brush Drag (poise) | 3.32 | 2.87 | 2.36 | 2.24 | 1.79 | 1.69 |

*Proportions are ±2%.

| | 100/0 | 88/12 | 74/26 | 56/44 | 32/68 | 0/100* |
|---|---|---|---|---|---|---|
| B-Blends of Urethane Polymer to Ester Emulsion Copolymer (weight ratio) | | | | | | |
| 3 lbs. AMP-95 Buffer/100 gal. of paint | | | | | | |
| Leveling (poise) | 158 | 1027 | 1248 | 1738 | 2054 | 2575 |
| Brush Drag (poise) | 2.97 | 3.00 | 2.81 | 2.52 | 2.17 | 1,60 |
| 6 lbs. | | | | | | |
| Leveling (poise) | 379 | 664 | 1217 | 1864 | 2465 | 2212 |
| Brush Drag (poise) | 3.19 | 3.12 | 2.84 | 2.46 | 2.17 | 1.82 |
| 10 lbs. | | | | | | |
| Leveling (poise) | 190 | 790 | 806 | 1059 | 2607 | 2481 |
| Brush Drag (poise) | 3.16 | 3.16 | 3.00 | 2.49 | 2.27 | 1.98 |
| 15 lbs. | | | | | | |
| Leveling (poise) | 458 | 395 | 932 | 2228 | 2955 | 3049 |
| Brush Drag (poise) | 3.32 | 3.26 | 2.99 | 2.59 | 2.33 | 1.72 |

*Proportions are ±3%.

From the standpoint of the rheology which is desired in aqueous latex paints, one needs an appropriate viscosity at high shear to provide the correct brush drag which determines the proper roller or brush application qualities, such as spreading rate and uniformity of coverage. This corresponds to a high shear viscosity of from 1.0-3.5 poise, preferably from 1.5-2.4 poise. When the brush drag is too low, the paint can be easily overspread, resulting in poor hiding of the surface being painted. When the brush drag is too high, painting involves excessive force which causes undue fatigue and other problems, and the paint may be applied in an excessive thickness which is wasteful. Also, paints characterized by excessive brush drag will not spray satisfactorily. On the other hand, one needs an appropriate viscosity under low shear to provide proper leveling of the applied film. This corresponds to a low shear viscosity of from 400-1600 poise, preferably from 500-1200 poise. With too high a low shear viscosity, the brush marks will not flow out, and with too little low shear viscosity, the applied coatings will tend to sag. Sag can be measured more precisely, and when it is, the blends of this invention have proper sag resistance.

As will be evident from the above tabulations, the blends using the urethane surfactant polymer provide the only instances in which acceptable leveling is combined with acceptable brush drag. This combination of excellent results is achieved with the largest proportion of surfactant copolymer when the proportion of buffer is increased.

In contrast, and using the ester surfactant copolymer is reported in portion B of the Table, whenever the leveling viscosity is appropriate, the brush drag viscosity is too high, and when the brush drag viscosity is acceptable, the leveling viscosity is too high.

The proportion of conventional buffering agent can be reduced by including some of the polyelectrolyte dispersant referred to previously. Curiously, while the use of a moderate proportion of dispersant, for example 5 pounds per 100 gallons, tends to enhance the rheological properties which can be obtained using the ester surfactant copolymer, the use of more dispersant is not very helpful because then the ester surfactant copolymer exhibits poor viscosity stability and also significant incompatibility leading to color separation. Blends containing the most urethane polymer in admixture with the ester surfactant copolymer and which possess the best rheological characteristics, exhibit moderate to heavy color separation. Accordingly, the poor compatibility between the urethane polymer and the ester surfactant copolymer limits the utility of these blends.

In contrast, the blends of this invention containing even 10 or 15 pounds of buffer per 100 gallons exhibits only very slight color separation on testing.

What is claimed is:

1. An alkaline aqueous latex paint having a high shear viscosity of from 0.1-3.5 poise and a low shear viscosity of from 400-1600 poise and having a pH of at least about 7.5 and having its rheology controlled by an effective amount of a combination of thickeners constituted by: (I) a urethane polymer having at least three hydrophobic groups, at least two of which are terminal hydrophobic groups, the hydrophobic groups being linked by hydrophilic groups; and (II) an alkali-soluble aqueous emulsion copolymer of: (A) about 20-70 weight percent of an alpha, beta-monoethylenically unsaturated carboxylic acid; (B) about 20-80 weight percent of a monoethylenically unsaturated monomer lacking surfactant capacity; (C) about 0.5-60 weight percent of a nonionic urethane monomer which is the urethane reaction product of a monohydric nonionic surfactant with a monoethylenically unsaturated monoisocyanate; and (D) from 0 up to about 2 weight percent of a polyethylenically unsaturated monomer.

2. A paint as recited in claim 1 in which said nonionic urethane monomer is alpha, alpha-dimethyl-m-isopropenyl benzyl isocyanate.

3. A paint as recited in claim 1 in which said hydrophobic groups of said urethane polymer contain at least about 20 carbon atoms and are linked together by water-soluble polyether segments each having a molecular weight of at least about 1,500.

4. A paint as recited in claim 3 in which said polyether segments are polyethylene oxide segments which have been joined by organic diisocyanate.

5. A paint as recited in claim 4 in which said polyethylene oxide segments are terminated with alkyl groups which contain from 12-22 carbon atoms.

6. A paint as recited in claim 1 in which said emulsion copolymer component (A) is methacrylic acid and said component (B) is ethyl acrylate.

7. A paint as recited in claim 1 in which said urethane polymer is used in a weight ratio with respect to the carboxyl-functional emulsion copolymer of from about 60:40 to 10:90.

8. A paint as recited in claim 7 in which said weight ratio is from 50:50 to 20:80.

9. A paint as recited in claim 1 in which the binder of said aqueous emulsion paint is an aqueous emulsion copolymer of monoethylenically unsaturated monomers providing a glass transition temperature below about 20° C.

10. A paint as recited in claim 9 in which the glass transition temperature is from −10° C. to +10° C.

11. A paint as recited in claim 9 in which the copolymer comprises a copolymer of at least 55% vinyl acetate with enough acrylic acid or methacrylic acid esters to provide the desired glass transition temperature.

12. A paint as recited in claim 11 in which the copolymer comprises a copolymer of about 85% vinyl acetate balance consisting essentially of n-butyl acrylate.

13. A paint as recited in claim 1 in which said paint, when dry, exhibits a 60° gloss reading in excess of 10.

14. A paint as recited in claim 11 in which said paint, when dry, exhibits a 60° gloss reading in excess of 10.

15. A paint as recited in claim 1 in which said paint comprises at least about 8 pounds of 2-amino-2-methyl-1-propanol per 100 gallons of paint.

16. A paint as recited in claim 1 in which said paint is buffered with a buffering agent constituted by additional alkaline agent raising the pH above 7.5 or by a polycarboxylic acid neutralized to a pH of 6.5 to 8.5, or a mixture thereof.

17. A paint as recited in claim 1 in which said paint comprises at least about 2 pounds of 2-amino-2-methyl-1-propanol and at least 2 pounds of a polyelectrolyte disperspant per 100 gallons of paint.

18. A paint as recited in claim 17 in which said polyelectrolyte dispersant is a carboxyl-functional copolymer neutralized with an amine to a pH in the range of 6.5 to 8.5.

19. A paint as recited in claim 1 in which said paint comprises at least about 3 pounds of 2-amino-2-methyl-1-propanol and at least 4 pounds of a polyelectrolyte dispersant per 100 gallons of paint.

20. A paint as recited in claim 19 in which said polyelectrolyte dispersant is a copolymer of a major weight proportion of methacrylic acid with a minor weight proportion of ethyl acrylate neutralized with ammonia to a pH in the range of 6.5 to 8.5.

21. A paint as recited in claim 1 in which said aqueous emulsion copolymer is a copolymer of: (A) about 25–60 weight percent of an alpha, beta-monoethylenically unsaturated carboxylic acid; (B) about 20–55 weight percent of a monoethylenically unsaturated monomer lacking surfactant capacity; (C) about 20–40 weight percent of a nonionic urethane monomer which is the urethane reaction product of a monohydric nonionic surfactant with a monoethylenically unsaturated monoisocyanate, as previously described; and (D) from 0 up to about 2 weight percent of a polyethylenically unsaturated monomer.

22. A paint as recited in claim 8 buffered with a buffering agent constituted by additional alkaline agent raising the pH above 7.5 or by a polycarboxylic acid neutralized to a pH of 6.5 to 8.5, or a mixture thereof and having a high shear viscosity of from 1.5–2.4 poise and a low shear viscosity of from 500–1200 poise.

23. A paint as recited in claim 22 having a pH in the range of pH 8.0 to pH 9.5.

24. A paint as recited in claim 21 which is a semi-gloss paint.

* * * * *